UNITED STATES PATENT OFFICE.

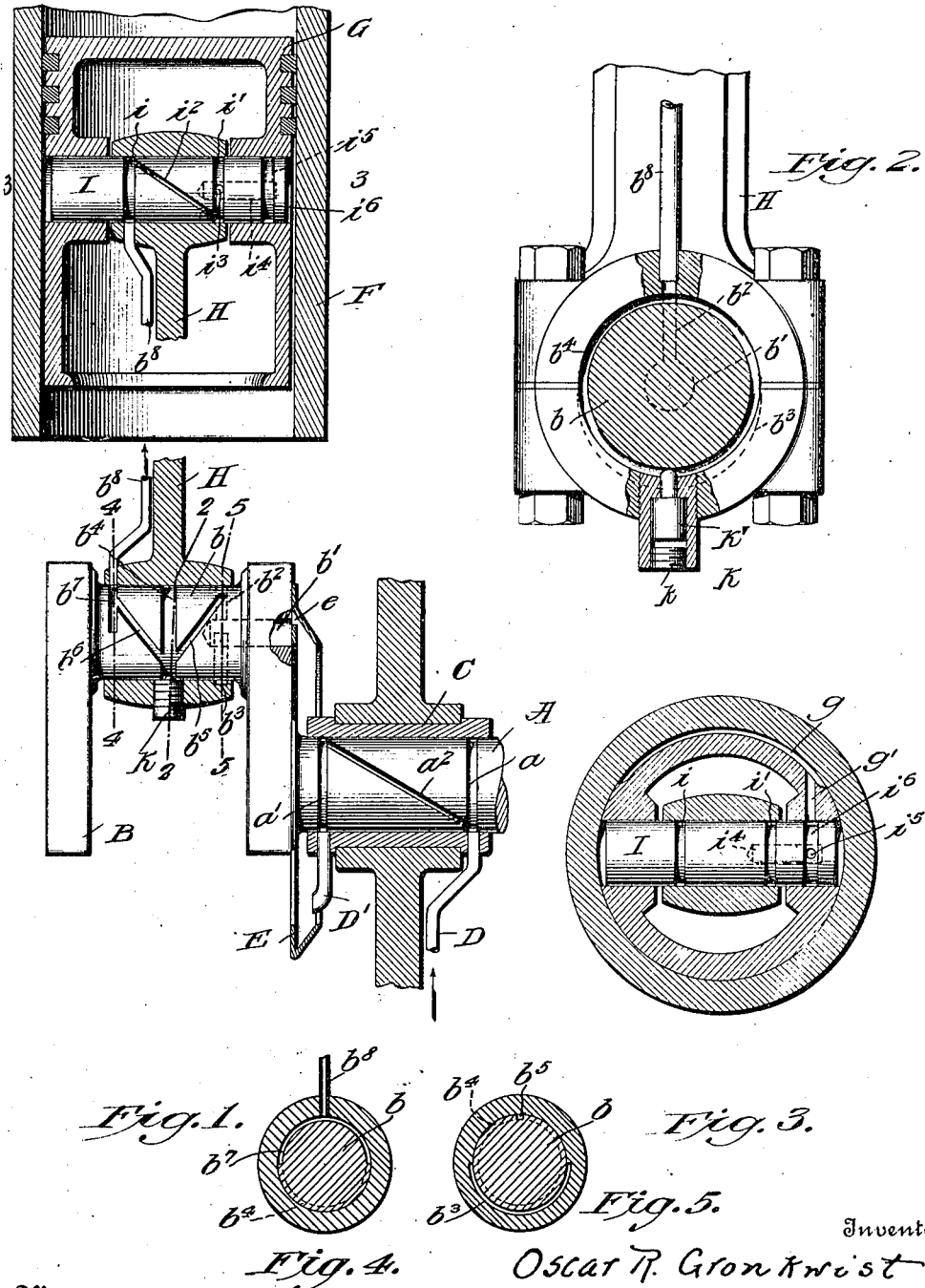

OSCAR ROBERT GRONKWIST, OF KATRINEHOLM, SWEDEN.

LUBRICATOR FOR ENGINES.

1,292,312. Specification of Letters Patent. Patented Jan. 21, 1919.

Application filed April 24, 1913, Serial No. 763,370. Renewed March 6, 1917. Serial No. 152,872.

*To all whom it may concern:*

Be it known that I, OSCAR ROBERT GRONKWIST, a subject of the King of Sweden, residing at Katrineholm, Sweden, have invented certain new and useful Improvements in Lubricators for Engines, of which the following is a specification.

This invention relates to an improvement in a lubricator for engines and more particularly internal combustion engines, and one of the objects of the invention is the provision of improved means for lubricating the engine shaft bearing the crank pin bearing, the piston pin bearing, and the interior of the engine cylinder.

A still further object of the present invention is the provision of improved lubricating means of this character of such a construction that the lubricant will be forced under pressure in predetermined quantities to the various points to be lubricated, so that the proper amount of lubricant will be supplied at all times.

A further object of the invention is the provision of lubricating means of this character in which the various points to be lubricated are connected serially, so that the lubricant is forced to take the proper course.

A further object of the invention is the provision of lubricating means of this character in which the rotation of the engine shaft is utilized to assist the forcing of the lubricant to the various points to be lubricated.

Other objects of the invention will be apparent from the detailed description hereinafter when read in connection with the accompanying drawings forming a part hereof, wherein a convenient embodiment of the invention is illustrated, and wherein like characters of reference refer to similar parts in the several views.

In the drawings, wherein a convenient embodiment of the invention is shown,

Figure 1 is a fragmentary longitudinal section of an internal combustion engine embodying the present invention.

Fig. 2 is a cross section on line 2—2 of Fig. 1.

Fig. 3 is a cross section on line 3—3 of Fig. 1.

Fig. 4 is a transverse section substantially on the line 4—4 of Fig. 1.

Fig. 5 is a transverse section substantially on the line 5—5 of Fig. 1.

Referring now more particularly to the drawings, A designates the engine shaft, B one of the cranks thereof, and $b$ the crank pin. C designates one of the bearings for the engine shaft and that portion of the shaft which is supported in said bearing is provided adjacent the ends of the bearing with grooves $a$, and $a'$ therein, which are formed in the exterior of the shaft and which extend therearound. The grooves $a$ and $a'$ are connected by a diagonally disposed groove $a^2$ which is formed in the exterior of the shaft. D designates a lubricant supply pipe which passes through the bearing C and is adapted to open into the annular groove $a$ formed in the shaft A adjacent one end of said bearing, said lubricant pipe conveniently extending from a source of lubricant under pressure. D' designates a pipe which leads from the lower portion of the bearing C and is in communication with the channel $a'$ in the shaft A, the lower end of said pipe being open and positioned to discharge into a dished ring E which is rigidly secured to the crank B adjacent the outer end thereof so as to rotate therewith and which surrounds the engine shaft.

F designates the engine cylinder, G the piston therein, and H a pitman, the lower end of which has a bearing on the crank pin $b$, and the upper end of which has a bearing upon a piston pin I which is secured in the piston G in the usual manner.

Extending inwardly into one end of the crank pin $b$ is a recess $b'$, the outer end of which communicates with the interior of the upper portion of the hollow ring E through the medium of a small port $e$ formed in said ring. By this construction, the lubricant after passing through the channels in the portion of the engine shaft in the bearing C, and thus lubricating said bearing falls into the ring E and as the ring rotates with the engine shaft the lubricant is forced through the ports $e$ in the ring into the recess $b'$ in the crank pin. The inner end of the passage $b'$ has extending radially therefrom a port $b^2$, the outer end of which extends to the exterior of the crank pin $b$, which port is adapted as the pitman bearing rotates around the crank pin to be brought into communication with a semi-circular channel $b^3$ which is formed in the lower portion of the pitman bearing sleeve adjacent one end thereof.

The crank pin $b$ is provided upon its exterior intermediate the ends thereof with an annular groove $b^4$ from which extends a diagonally disposed groove $b^5$, the end of which is adapted to be moved into and out of communication with the semi-circular groove $b^3$ in the sleeve of the pitman bearing as said sleeve rotates about the crank pin, and with a similar groove $b^6$ which extends toward the opposite end of the crank pin and communicates with a semi-circular channel $b^7$ which is formed in the exterior of one end of the crank pin and which is adapted upon rotation of the sleeve of the pitman bearing around the crank pin to be moved into and out of communication with the lower end of a pipe $b^8$, which is secured in the upper portion of the sleeve of the pitman bearing and extends upwardly alongside of the pitman, the upper end of said pipe projecting into one end of the sleeve at the upper end of the pitman which surrounds the piston pin I. The construction of the grooves and channels in the piston pin $b$ is such that when the groove $b^5$ is in communication with the channel $b^3$ the channel $b^7$ is out of communication with the pipe $b^8$, and that when the groove $b^5$ is out of communication with the groove $b^3$ the channel $b^7$ is in communication with the pipe $b^8$. Secured in the lower portion of the sleeve of the pitman bearing intermediate the ends thereof is a radially disposed sleeve K in which is loosely mounted so as to be freely movable, a plunger K' which projects into the annular groove $b^4$ which is formed in the central portion of the crank pin $b$. Inward movement of the plunger K' is limited by means of a shoulder which is formed on said plunger and which coöperates with a shoulder formed in the sleeve K, while outward movement of the plunger is limited by means of an adjustable plug $k$ which is secured in the outer end of the sleeve. By adjusting the plug $k$ the range of movement of the plunger can be so varied that the distance which the plunger moves out of the groove $b^4$ can be regulated at will.

With the construction thus described, it will be seen that as the engine shaft is rotated the plunger K' will be caused to reciprocate in the sleeve K, and the construction is such that when the plunger is thrown out of the groove or channel $b^4$ the groove $b^5$ will be in communication with the channel $b^3$ in the pitman bearing sleeve, which channel $b^3$ will have received a supply of lubricant from the recess $b'$ and the port $b^2$. The end of the plunger K' will move in the groove $b^4$ for a certain length of time during the travel of the connecting rod bearing around the crank pin, and thereby cause a quantity of oil to be pushed into the groove $b^6$, the groove $b^5$ being at that time out of communication with the inlet $b^2$. This action continues automatically as the crank shaft is rotated, so that there is constantly drawn through the crank pin bearing and forced out therefrom a predetermined quantity of lubricant, and as the lubricant is caused to traverse practically the entire outer surface of the crank pin in passing therethrough, it will be seen that the crank pin bearing will be thoroughly and properly lubricated.

The piston pin I has formed in the exterior thereof adjacent one end of the pitman sleeve which surrounds the same, an annular groove $i$, which groove is positioned so as to receive the lubricant which is forced through the pipe $b^8$. The piston pin I has also formed in the exterior thereof adjacent the other end of the sleeve of the pitman which surrounds the same another annular groove $i'$, the grooves $i$ and $i'$ being connected by a diagonally disposed groove $i^2$ which is formed in the exterior of the piston pin, so that the oil which enters the piston pin bearing through the pipe $b^8$ first fills the channel $i$ and then passes through the groove or channel $i^2$ to the channel $i'$, thus effecting the proper lubrication of the piston pin bearing. The piston pin is provided with a radially extending port $i^3$ which extends inwardly from the groove or channel $i'$ and communicates with a longitudinally disposed recess $i^4$, which is formed in the central portion of one end of the piston pin. Leading from the outer end of the recess $i^4$ is a radially disposed passage $i^5$ which opens into an annular groove $i^6$ which is formed in the outer surface of the piston pin I adjacent one end thereof. The piston G is provided in one side thereof just below the packing rings with a transversely disposed groove or channel $g$ from which a port or passage $g'$ extends into the groove or channel $i^6$ in the end of the piston pin I. From this construction, it will be seen that after the oil traverses the piston pin bearing, it passes under pressure through the port $i^3$ into the chamber $i^4$, thence through the port $i^5$ into the annular groove $i^6$, and from thence through the port $g'$ into the groove $g$, from whence it flows down the cylinder wall. It has been demonstrated that it is usually sufficient to lubricate one side of the cylinder wall and hence the piston is illustrated as being provided with but a single groove $g$. Obviously, however, if desired, a similar groove may be positioned on the opposite side of the piston.

From the hereinbefore described construction, it will be seen that when a lubricant is supplied under pressure to pipe D, such lubricant will first pass through the engine shaft bearing, thoroughly lubricating the same and will then be automatically transferred to the crank pin bearing, and forced through the crank pin bearing so as to properly lubricate the same and transferred therefrom under pressure to the piston pin bearing, forced therethrough and to the exterior of the piston for the proper lubrication of the cylinder walls. It will be noted that the several bearings are connected serially with a single lubricant supply pipe, which is an advantageous construction, as it positively insures the proper amount of oil being distributed to all of the bearings, whereas where separate pipes are led to the individual bearings to be lubricated from a common supply pipe, the lubricant in seeking the easiest course is frequently distributed in unequal quantities to the bearings. Furthermore, this construction obviates the necessity of using a large number of distributing pipes which lead from the source where the lubricant is delivered under pressure.

While a convenient embodiment of the invention is illustrated in the accompanying drawings, it will be understood that many changes may be made to the construction therein shown without departing from the spirit and scope of the invention as defined in the appended claims.

Having thus described the invention, what I claim as new and desire to secure by Letters Patent is:

1. In a lubricator the combination with a member having a bearing thereon adapted to support a relatively movable crank pin, of means for forcing the lubricant through said bearing including a pump element positioned on the bearing.

2. In a lubricator, the combination with a bearing adapted to engage a rotatable part and provided with oil inlet and outlet ports leading thereto, said oil inlet port being connected to a source of lubricant, and a pump element positioned upon the bearing and automatically operable upon the rotation of the rotatable part to draw oil through the inlet port and force the same through the outlet port.

3. In a lubricator, the combination with a bearing for a rotatable part, said bearing being provided with oil inlet and outlet ports leading thereto, said oil inlet port being connected to a source of lubricant, and a reciprocating plunger positioned upon the bearing and automatically operable upon the rotation of said rotatable part to draw oil through the inlet port and force the same through the outlet port.

4. In a lubricator for engines, the combination with the engine shaft provided with a crank pin, a pitman having a bearing thereon, said crank pin bearing being provided with oil inlet and outlet ports leading thereto and the adjacent portions of the crank pin and bearing being provided with a pocket therebetween adapted to alternately communicate with said oil inlet and outlet ports upon rotation of the engine shaft, and means movable out of said pocket when the same is in communication with the inlet port and into said pocket when the same is in communication with the outlet port.

5. In a lubricator for engines, the combination with the engine shaft provided with a crank pin, a pitman having a bearing thereon, said crank pin bearing being provided with oil inlet and outlet ports leading thereto and the adjacent portions of the crank pin and bearing being provided with a pocket therebetween adapted to alternately communicate with said oil inlet and outlet ports upon rotation of the engine shaft, and a plunger mounted on the bearing and automatically movable out of said pocket when the same is in communication with the inlet port and into said pocket when the same is in communication with the outlet port.

6. In a lubricator for engines, the combination with the engine shaft provided with a crank pin, a pitman having a bearing thereon, said crank pin bearing being provided with oil inlet and outlet ports leading thereto and the adjacent portions of the crank pin and bearing being provided with a pocket therebetween adapted to alternately communicate with said oil inlet and outlet ports upon rotation of the engine shaft, a plunger positioned upon the bearing and automatically movable out of said pocket when the same is in communication with the inlet port and into said pocket when the same is in communication with the outlet port, and means for varying the extent of movement of said plunger.

7. In a lubricator for engines, the combination with the engine shaft provided with a crank pin, a pitman having a bearing thereon, said crank pin bearing being provided with oil inlet and outlet ports leading thereto, and the adjacent portions of the crank pin and bearing being provided with a pocket therebetween adapted to alternately communicate with said oil inlet and outlet ports upon rotation of the engine shaft, and a reciprocating plunger positioned adjacent the wall of the bearing and automatically movable out of said pocket when the same is in communication with the inlet port and into said pocket when the same is in communication with the outlet port.

8. In a lubricator for engines, the combination with the engine shaft provided with a crank pin, a pitman having a bearing thereon, said crank pin bearing being provided with oil inlet and outlet ports leading thereto and the adjacent walls of the crank pin and bearing being provided with a pocket therebetween adapted to alternately communicate with said oil inlet and outlet portions upon rotation of the engine shaft, and a movable plunger loosely mounted between said adjacent walls and freely movable into and out of said pocket, said pocket and ports being so positioned relatively to each other that the plunger will be automatically shifted out of the pocket when the same is in communication with the inlet port and into the pocket when the same is in communication with the outlet port.

9. In a lubricator, the combination with a bearing, of means for forcing a lubricant through said bearing including an automatically operated pump element positioned on the wall of the bearing.

10. In a lubricator, the combination with a bearing provided with oil inlet and outlet ports leading thereto, a rotatable member in said bearing, and the adjacent portions of the rotatable member and said bearing being provided with a pocket therebetween adapted to alternately communicate with said oil inlet and outlet ports upon rotation of the rotatable member, and means movable out of said pocket when the same is in communication with the inlet port and into said pocket when the same is in communication with the outlet port.

11. In a lubricator, the combination with a bearing provided with oil inlet and outlet ports leading thereto, a rotatable element in said bearing, the adjacent walls of said rotatable member and bearing being provided with a pocket therebetween adapted to alternately communicate with said oil inlet and outlet ports upon rotation of the rotatable element of the bearing, and a plunger positioned between the walls of the rotatable element and bearing and automatically movable out of said pocket when the same is in communication with the inlet port and into said pocket when the same is in communication with the outlet port.

12. In a lubricator, the combination with a bearing provided with oil inlet and outlet ports leading thereto, a rotatable element in said bearing, the adjacent walls of said rotatable element and bearing being provided with a pocket therebetween adapted to alternately communicate with said oil inlet and outlet ports upon rotation of the rotatable element of the bearing, a plunger positioned between the walls of the rotatable element and bearing and automatically movable out of said pocket when the same is in communication with the inlet port and into said pocket when the same is in communication with the outlet port, and means for varying the extent of movement of said plunger.

13. In a lubricator the combination of a member having a bearing, a crank pin, positioned within said bearing, an oil inlet and an oil outlet for said bearing, the bearing and pin forming therebetween oil feed grooves, and an automatically operable plunger positioned on said bearing and adapted to communicate with said grooves.

14. In a lubricator, the combination of a pitman having a bearing, a crank pin movably seated in said bearing, oil channels or grooves interposed between said crank pin and inner surface of said bearing, said bearing having an oil inlet through the crank pin to said grooves, and an outlet conduit leading from the bearing at a point removed from the inlet, and an automatically operable plunger positioned on said bearing and operatively associated with said grooves.

15. In a lubricator the combination of a member having a bearing, a crank pin, positioned within said bearing, an oil inlet and an oil outlet for said bearing, the bearing and pin being constructed to form therebetween oil feed grooves, and an automatically operable movable element positioned on said bearing and adapted to engage in said grooves, substantially as and for the purpose described.

16. In a lubricator the combination of a pitman having a bearing, a crank pin or the like movably seated in said bearing, oil channels or grooves interposed between said crank pin and inner surface of said bearing, said bearing having an oil inlet through the crank pin to said grooves, and an outlet conduit leading from the bearing at a point removed from the inlet, and a member positioned on said bearing and operatively positioned with respect to said grooves to produce a pumping effect, said member being adjustable whereby to regulate the passage of the oil through said grooves from the inlet to the outlet conduit.

In testimony whereof I affix my signature in presence of two witnesses.

OSCAR ROBERT GRONKWIST.

Witnesses:
LILIAN D. HEATH,
W. H. DRANEY.